V. DAHL.
HOSE COUPLING.
APPLICATION FILED MAY 18, 1909.

1,043,806.

Patented Nov. 12, 1912.

WITNESSES
H. L. Murdock
N. Whiting

INVENTOR
Valentine Dahl
BY
Munn & Co
ATTORNEYS

UNITED STATES PATENT OFFICE.

VALENTINE DAHL, OF NEW YORK, N. Y., ASSIGNOR TO AMERICAN BRIDGE COMPANY, OF NEW YORK, N. Y., A CORPORATION OF NEW JERSEY.

HOSE-COUPLING.

1,043,806.  Specification of Letters Patent.  Patented Nov. 12, 1912.

Application filed May 18, 1909. Serial No. 496,830.

*To all whom it may concern:*

Be it known that I, VALENTINE DAHL, a citizen of the United States, and a resident of the city of New York, borough of Brooklyn, in the county of Kings and State of New York, have invented a new and Improved Hose-Coupling, of which the following is a full, clear, and exact description.

Reference is to be had to the accompanying drawings forming a part of this specification, in which similar characters of reference indicate corresponding parts in all the views, and in which—

Figure 1:
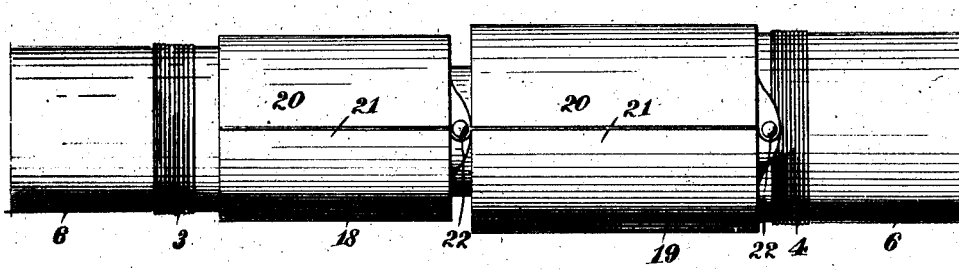
Figure 2:
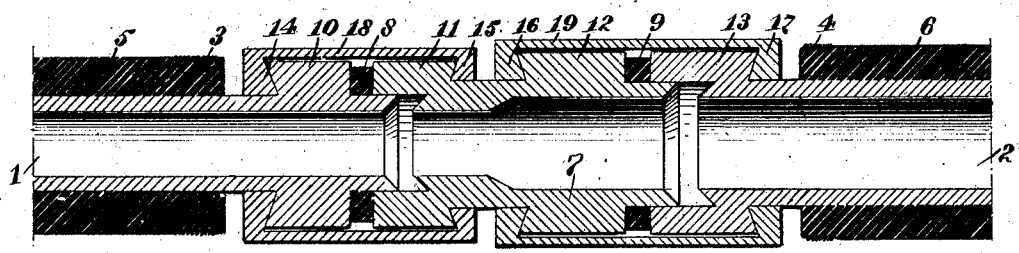
Figure 4:
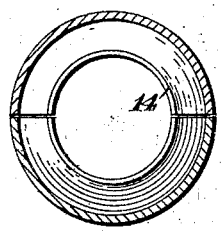
Figure 3:
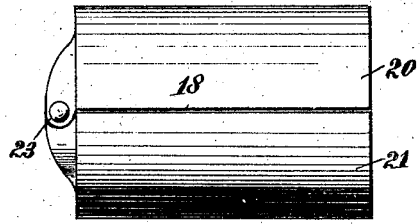
Figure 5:
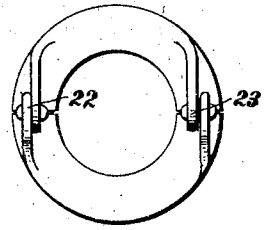
Figure 6:
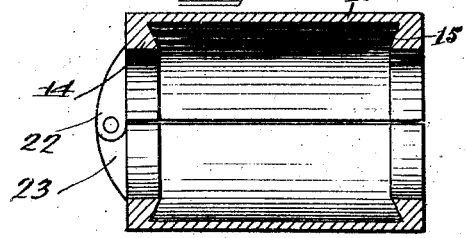

Figure 1 is a plan view; Fig. 2 is a longitudinal section through the center of the device; Fig. 3 is a plan view of the coupling sleeve; Fig. 4 is a transverse section through the coupling sleeve; Fig. 5 is an end view showing the hinged relation of the members of the coupling sleeve; and Fig. 6 is a longitudinal section through the center of the coupling sleeve.

Referring more particularly to the separate parts, 1 and 2 indicate suitable hose-coupling members, to which are secured in any well-known manner, as by means of wire-wrappings 3 and 4, hose-pipes 5 and 6.

In the form shown in the drawings, the coupling members 1 and 2 are of different diameters, and there is therefore provided a reducing member 7, interposed between them and separated from them by a suitable resilient substance, such as rubber packing rings 8 and 9. All of the parts 1, 2 and 7 have cylindrical flanges 10, 11, 12 and 13 thereon, to engage the rings 8 and 9. Each of these flanges 10, 11, 12 and 13 is also provided with undercut grooves, which are adapted to be engaged by suitable cylindrical undercut flanges 14, 15, 16 and 17, which extend inwardly from one or more sleeves 18 and 19, whereby said members are secured together. The sleeves 18 and 19 are preferably formed in two parts 20 and 21, which are pivoted together in any suitable manner, as by means of hinges 22 and 23.

While the device has been shown as attached to hose members of different sizes, with an intermediate reducing member, it may be also attached to hose-attaching members of the same size, in which case, the intermediate reducing member is unnecessary, and only a single sleeve need be used to secure the members together.

The coupling members and the reducing member have been shown telescoping one in the other, but this is not absolutely necessary, as they may terminate at the beginning of the rings 8 and 9.

The method of attaching the separate members will be readily understood from the above description. The two adjacent members are squeezed toward each other against the resilient action of the spring member between them, and the two parts 20 and 21 of the sleeve, separated, and the undercut flanges snapped into the undercut grooves on the separate members. The members are then allowed to separate under the action of the spring means between them, thus forcing the flanges and grooves together, forming an intimate locking joint.

While the members have been described as having a groove, and the sleeve as having the flange, it may be said that either or both have a flange-and-groove connection.

Having thus described my invention, I claim as new and desire to secure by Letters Patent:—

1. In a hose coupling, the combination with coupling members, of a reducing member intermediate said coupling members, undercut flanges on all of said members, a plurality of sleeves having engaging undercut flanges thereon adapted to secure said members together, and resilient means between said members adapted to force said flanges into interlocking engagement.

2. In a hose coupling, the combination with attaching members, of a reducing member located intermediate said attaching member, rubber washers between said members, cylindrical undercut flanges on said members, and a plurality of sleeves for inclosing said flanges and having undercut flanges thereon adapted to engage said flanges on said members, said sleeves comprising two parts alined together.

In testimony whereof I have signed my name to this specification in the presence of two subscribing witnesses.

VALENTINE DAHL.

Witnesses:
HORATIO WHITING,
PHILIP D. ROLLHAUS.

Copies of this patent may be obtained for five cents each, by addressing the "Commissioner of Patents, Washington, D. C."